United States Patent [19]
Koizumi

[11] 4,223,378
[45] Sep. 16, 1980

[54] SWITCHING REGULATOR

[75] Inventor: Akio Koizumi, Tokyo, Japan

[73] Assignee: Sony Corporation, Tokyo, Japan

[21] Appl. No.: 962,654

[22] Filed: Nov. 21, 1978

[30] Foreign Application Priority Data

Nov. 22, 1977 [JP] Japan ................... 52-140403

[51] Int. Cl.² .......................................... H02M 3/335
[52] U.S. Cl. ..................................... 363/26; 363/97; 363/134
[58] Field of Search ................ 323/17, DIG. 1, 22 T, 323/25; 363/20-21, 78-80, 97, 26, 37, 41, 134

[56] References Cited

U.S. PATENT DOCUMENTS

| | | | |
|---|---|---|---|
| 3,670,234 | 6/1972 | Joyce | 363/134 X |
| 3,978,393 | 8/1976 | Wisner et al. | 323/17 |
| 4,087,850 | 5/1978 | Koizumi | 363/21 |
| 4,121,282 | 10/1978 | Ousawa | 363/21 |

*Primary Examiner*—J. D. Miller
*Assistant Examiner*—Peter S. Wong

*Attorney, Agent, or Firm*—Hill, Van Santen, Steadman, Chiara & Simpson

[57] ABSTRACT

A switching regulator includes a DC voltage source having a pair of DC output terminals, a switching transformer having first and second primary windings connected in series, a magnetic core and a secondary winding, a first switching transistor connected in series between the pair of DC output terminals through the first primary winding, a second switching transistor connected in series between the pair of DC output terminals through the first and second primary windings, a rectifier circuit connected across the secondary winding. A pulse width modulator is provided to produce a PWM (pulse width modulated) control signal the duty of which is proportional to the voltage of the rectifier circuit and the PWM control signal is selectively supplied to one of the first and second switching transistors in accordance with the low or high circumstance of the load. Further, a reference pulse signal having a standard pulse width is provided, which is compared with the PWM control signal so as to selectively supply the PWM control signal to one of the first and second switching transistors.

11 Claims, 8 Drawing Figures

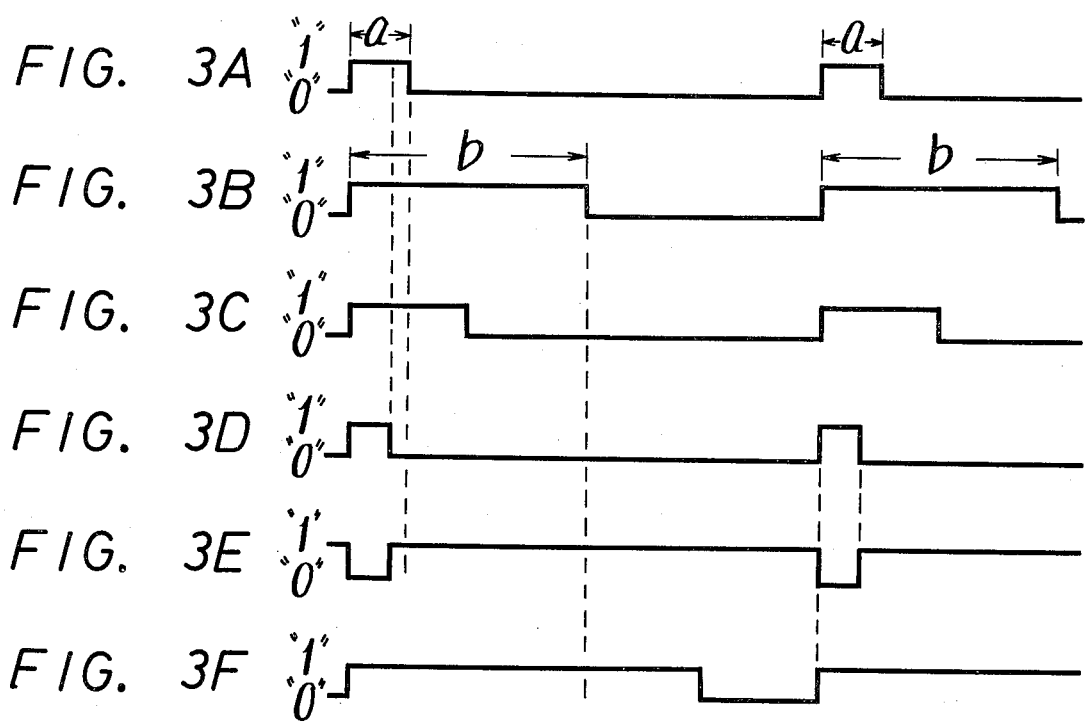

SWITCHING REGULATOR

BACKGROUND OF THE INVENTION

1. Field of the Invention

The present invention relates generally to a switching regulator, and is directed more particularly to a switching regulator which can supply a stable DC voltage without the efficiency being lowered and regardless of large load variation.

2. Description of the Prior Art

In the art there has been proposed a switching regulator which can supply a stable DC voltage without the efficiency being lowered and regardless of large load variation. An example of such a prior art switching regulator will be described with reference to FIG. 1, which is disclosed in my copending U.S. Ser. No. 760,457, and which is assigned to the same assignee as the present invention. In the prior art switching regulator shown in FIG. 1, a power source plug 1, which is arranged to be connected from a commercial AC voltage, through power source switches 2 to a rectifier circuit 3 which rectifies the applied AC voltage to a DC voltage. The DC voltage from the rectifier circuit 3 is applied through a primary winding 4a of a transformer 4, which has a magnetic core, and a diode 5 for blocking a reverse current to an NPN transistor 6 which serves as a first switching element. The DC voltage appearing at a mid tap of the primary winding 4a is applied to an NPN transistor 7 which serves as a second switching element. In this case, the inductance value of the primary winding 4a between one end and the mid tap thereof is taken as $L_1$ and that between the mid tap and the other end of the primary winding 4a is taken as $L_2$, respectively.

At a secondary winding 4b of the transformer 4 there appears an AC voltage, which is then fed to a rectifier circuit 8 to be rectified and smoothed as a DC voltage. This DC voltage is delivered to an output terminal 9. The DC voltage delivered to the output terminal 9 is applied to a voltage detecting circuit 10 which then detects the value of the applied DC voltage. The detected output is then fed through a coupler 11 such as a photo-coupler or the like for insulating-separation to a pulse width modulator 12, which will produce a switching signal, as a modulating input. While, the pulse width modulator 12 is supplied with a clock pulse from a clock pulse oscillator 13 as a carrier. Thus, the switching signal obtained at the output side of the pulse width modulator 12 has a pulse width which is changed so as to make the DC voltage obtained at the output terminal 9 stable to be of a desired constant value.

In the example of FIG. 1, between the secondary winding 4b of the transformer 4 and the ground, there is connected a resistor 14 of small resistance value for detecting a current, and the voltage drop across the resistor 14 is applied to a current detecting circuit 15. When the voltage drop across the resistor 14, i.e., output current from the output terminal 9 is lower than a predetermined value $I_{TH}$, the output side of the current detecting circuit 15 becomes a low level "0", but becomes a high level "1" when the output current is higher than the predetermined value $I_{TH}$. This detected output from the current detecting circuit 15 is applied through a coupler 16 such as a photo-coupler or the like for insulating-separation to a memory circuit such as a D-type flip-flop circuit 17 at its D-input terminal which is also supplied at its trigger input terminal T with the clock pulse from the clock pulse oscillator 13. The output at a $\overline{Q}$-output terminal of the D-type flip-flop circuit 17 is applied as a gate signal to one input terminal of an AND circuit 18 which is also supplied at its other input terminal with the switching signal from the pulse width modulator 12. The switching signal passed through the AND circuit 18 is fed to the base of the transistor 6. While, the output at a Q-output terminal of the D-type flip-flop circuit 17 is applied as a gate signal to one input terminal of an AND circuit 19 which is also supplied at its other input terminal with the switching signal from the pulse width modulator 12. The switching signal passed through the AND circuit 19 is fed to the base of the transistor 7.

With the prior art switching regulator having the construction described above and shown in FIG. 1, when a load (not shown) connected to the output terminal 9 is low, the output current at the output terminal 9 is reduced. However, when the output current at the output terminal 9 is lower than the predetermined value or threshold level $I_{TH}$ of the current detecting circuit 15, its detected output becomes "0". As a result, the output at the Q-output terminal of the D-type flip-flop circuit 17 becomes "0" in synchronism with the clock pulse from the clock pulse oscillator 13 so that the transistor 7 turns OFF.

At this time, however, since the output at the $\overline{Q}$-output terminal of the flip-flop circuit 17 becomes "1", the switching signal from the pulse width modulator 12 is applied through the AND circuit 18 to the base of the transistor 6. Therefore, the input DC voltage is switched by the transistor 6, and hence an output DC voltage $V_O$ is delivered to the output terminal 9. In this case, since an input DC voltage $V_i$ from the rectifier circuit 3 is applied to all of the primary winding 4a of the transformer 4, i.e., series connection of the inductances $L_1$ and $L_2$, and if it is assumed that the duty ratio of the switching signal is taken as D, the period thereof is taken as $T_P$ and the resistance value of the load is taken as $R_L$, respectively, the output DC voltage $V_O$ is expressed as follows:

$$V_0 = V_i \cdot D \sqrt{\frac{R_L \cdot T_P}{2(L_1 + L_2)}}$$

When the maximum output electric power is taken as $P_O$, it is expressed as follows:

$$P_0 = \frac{V_0^2}{R_L} = \frac{V_i^2 \cdot D^2 \cdot T_P}{2(L_1 + L_2)} \quad (1)$$

Accordingly, with the above prior art switching regulator, if the inductance values $L_1$ and $L_2$ are previously selected suitably, a sufficiently stable DC voltage $V_O$ for the load variation can be obtained even when the load is low. When the load is rather high, the output current at the output terminal 9 becomes great. When the output current at the output terminal 9 exceeds the threshold level $I_{TH}$ of the current detecting circuit 15, its detecting output becomes "1". Therefore, the output at the $\overline{Q}$-output terminal of the flip-flop circuit 17 becomes "0" in synchronism with the clock pulse from the clock pulse oscillator 13, and hence the output from the AND circuit 18 becomes "0". As a result, the transistor 6 turns OFF. However, at this time the output at the Q-output terminal of the flip-flop circuit 17 becomes "1" so that the switching signal from the pulse width modulator 12 is fed through the AND circuit 19 to the base of the transistor 7 to operate the same. Thus, at this time, the primary winding 4a of the transformer 4 from its one end to its mid tap is used so that the inductance value of this case is only $L_1$. Therefore, the maximum output electric power $V_O$ of this case is expressed as follows:

$$P_O = V_i^2 \cdot D^2 \cdot T_P / 2L_1 \qquad (2)$$

In this case, since the inductance value becomes small as compared with a low load, the maximum output electric power $P_O$ obtained at the output terminal 9 becomes great as apparent from the equations (1) and (2). That is, even when a large output is derived, the DC voltage at the output terminal 9 is stable which is also sufficiently stable for load variation even when the load is high. Further, in this case since the inductance value is changed to $(L_1+L_2)$ or $L_1$ in response to the load variation, the efficiency is not lowered any. In this case, the transistor 6 or 7 is switched by the switching signal obtained at the output side of the pulse width modulator 12, so that a desired constant DC voltage can be produced at the output terminal 9.

With the above prior art switching regulator, however, in order to detect load variation, the current at the secondary side of the transformer 4 is detected, so that the coupler 16 such as a photo-coupler or the like is necessary so as to insulate the primary side of the transformer 4 from its secondary side and also the resistor 14 for current detection, current detecting circuit 15 are necessary. Therefore, the above prior art switching regulator is complicated in circuit construction and accordingly expensive.

OBJECTS AND SUMMARY OF THE INVENTION

Accordingly, an object of the invention is to provide a switching regulator free from the defects inherent to the prior art.

Another object of the invention is to provide a switching regulator in which a pair of switching transistors are selectively changed to be used in accordance with whether a load is low or high.

A further object of the invention is to provide a switching regulator in which a PWM signal having the pulse width proportional to a load voltage is compared with a reference pulse having a reference pulse width and a pair of switching transistor are selectively changed by the compared output.

In accordance with an aspect of the present invention, a switching regulator is provided, which includes a DC voltage source having a pair of first and second DC output terminals, a switching transformer having first and record primary windings connected in series, a magnetic core, a secondary winding, a first switching transistor connected in series between the first and second DC output terminals through the first primary winding, a second switching transistor connected in series between the first and second DC output terminals through the first and second primary windings, a rectifying circuit connected across the secondary winding, a load connected to the rectifying circuit, a clock pulse oscillator, a pulse width modulator supplied with both outputs from the clock pulse oscillator and rectifying circuit so as to produce a PWM control signal the duty of which is proportional to the voltage of the rectifying circuit, a circuit for selectively supplying the PWM control signal to the first and second switching transistors in response to the circumstance of the load, the switching regulator further comprising a reference pulse signal generating circuit for producing a reference pulse signal having a standard pulse width, a comparing circuit for comparing the pulse width of the PWM control signal with that of the reference pulse signal and producing a switching signal indicative of the circumstance of the load in response to the comparison result therebetween, and a gate circuit supplied with the PWM control signal from the pulse width modulator and the switching signal from the comparing circuit so as to supply the PWM control signal to one of the first and second switching transistors in response to the switching signal.

The other objects, features and advantages of the present invention will become apparent from the following description taken in conjunction with the attached drawings through which the like reference numerals designate the same elements.

BRIEF DESCRIPTION OF THE DRAWINGS

FIGS. 3A to 3F are respectively waveform diagrams used for explaining an operation of the switching regulator of the invention shown in FIG. 2.

DESCRIPTION OF THE PREFERRED EMBODIMENT

Figure 1:
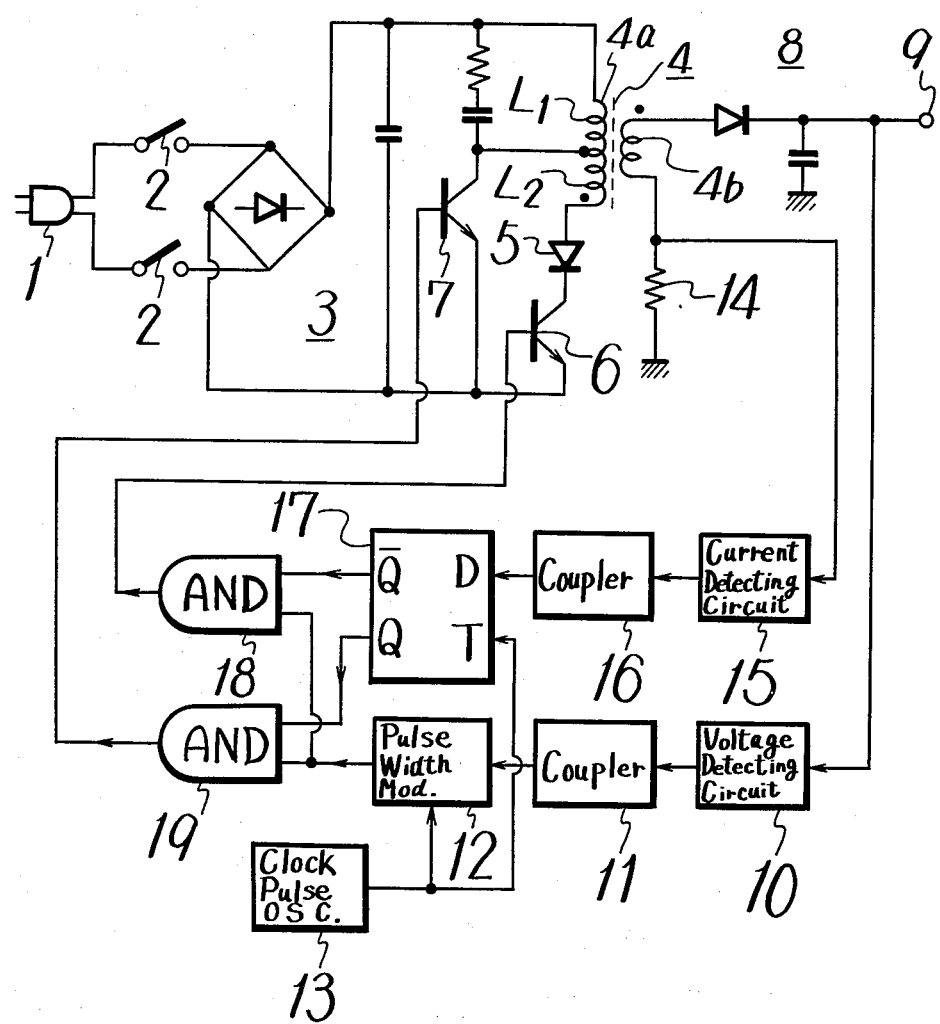
FIG. 1 is a connection diagram, partially in blocks, showing an example of the prior art switching regulator.

An example of the switching regulator according to the present invention will be described with reference to FIG. 2 and FIGS. 3A to 3F in which the elements corresponding to those in FIG. 1 are marked with the same reference numerals and their detailed description will be omitted.

Figure 2:
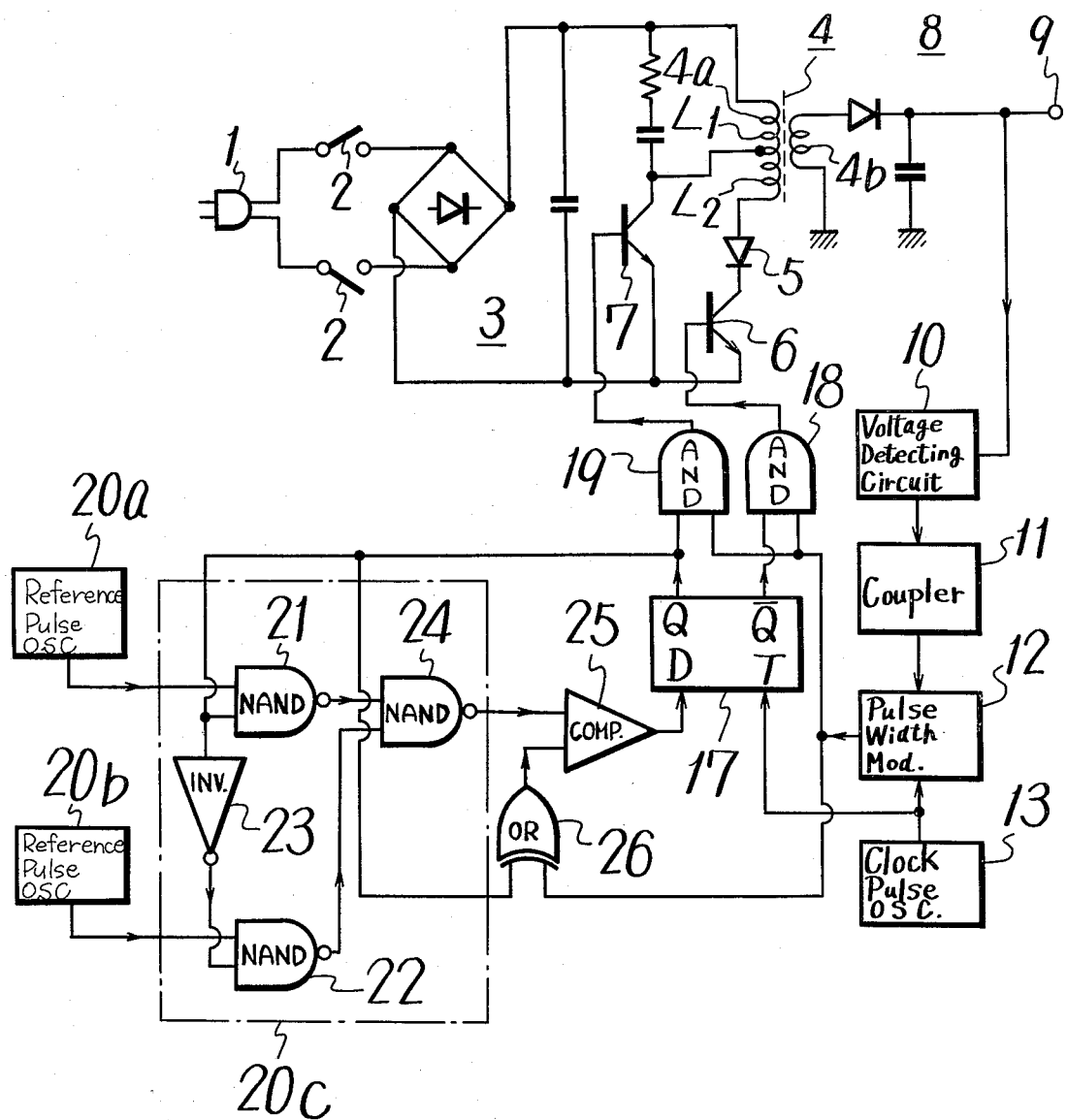
FIG. 2 is a connection diagram, partially in blocks, showing a preferred example of the switching regulator according to the present invention.

Turning to FIG. 2, there is provided a first and a second reference pulse oscillators 20a and 20b. A first reference pulse delivered from the first reference pulse oscillator 20a is selected, as shown in FIG. 3A, to have a pulse width a which is little wider than the minimum pulse width of the switching signal from the output side of the pulse width modulator 12 which minimum pulse width appears when the load becomes low upon the transistor 7 being used, and a second reference pulse delivered from the second referenc pulse oscillator 20b is selected, as shown in FIG. 3B, to have a pulse width b which is expressed by the following expression $$D_b \geq \sqrt{\frac{L_1 + L_2}{L_1}} \times D_a$$

where $D_a$ represents the duty ratio of the first reference pulse and $D_b$ represents the duty ratio of the second reference pulse, respectively. In this case, the first and second reference pulses are selected to be in synchronism with the clock pulse from the clock pulse oscillator 13.

The first reference pulse from the first reference pulse oscillator 20a is applied to one of the input terminals of a first NAND circuit 21 which is also supplied at the other input terminal thereof with the output "0" or "1"

obtained at the Q-output terminal of the D-type flip-flop circuit 17, while the second reference pulse from the second reference pulse oscillator 20b is applied to one of the input terminals of a second NAND circuit 22 which is also supplied at the other input terminal thereof with the output at the Q-output terminal of the flip-flop circuit 17 through an inverter 23. The output signals from the NAND circuits 21 and 22 are applied to both input terminals of a third NAND circuit 24, respectively. In this case, the NAND circuits 21, 22, 24 and inverter 23 form a reference pulse selecting circuit 20c. At the output side of the NAND circuit 24 there are obtained the first reference pulse when the output signal at the Q-output terminal of the flip-flop circuit 17 is "1" while the second reference pulse when the output signal at the Q-output terminal is "0", respectively. The first or second reference pulse appeared at the output side of the NAND circuit 24 is fed to one of the input terminals of a comparator 25. The switching signal, which is the output signal from the pulse width modulator 12, is applied to one of the input terminals of an exclusive OR circuit 26 which is also supplied at its other input terminal with the signal "0" or "1" obtained at the Q-output terminal of the flip-flop circuit 17. The output signal from this exclusive OR circuit 26 is applied to the other input terminal of the comparator 25. This comparator 25 is so selected that its output side becomes "1" at the falling down of the reference pulse when the output signal from the exclusive OR circuit 26 is a high level signal "1". The output signal from the comparator 25 is fed to the flip-flop circuit 17 at the D-terminal thereof. The other circuit construction of the invention shown in FIG. 2 is substantially same as that shown in FIG. 1.

An operation of the switching regulator according to the present invention constructed as above will be now described with reference to FIGS. 3A to 3F. If it is assumed that the switching signal or output signal from the pulse width modulator 12 has the pulse width as shown in FIG. 3C, this pulse width is wider than that a of the first reference pulse (refer to FIG. 3A) but narrower than that b of the second reference pulse (refer to FIG. 3B). When the Q-output terminal of the flip-flop circuit 17 is "1", the switching signal is applied through the AND circuit 19 to the base of the transistor 7 and hence it is switched by the DC output voltage at the output terminal 9 to make the DC output voltage constant. At this time, the first reference pulse is delivered to the output side of the NAND circuit 24. From this state, when the load connected to the output terminal 9 becomes low and the pulse width of the switching pulse from the pulse width oscillator 12 becomes narrower than the pulse width a of the first reference pulse as shown in FIG. 3D, the output signal from the exclusive OR circuit 26 is already "1" at the falling of the first reference pulse as shown in FIG. 3E. Therefore, the output from the comparator 25 becomes "0" during the following cycle. This output from the comparator 25 is applied to the flip-flop circuit 17 to inverse the same in synchronism with the clock pulse with the result that the Q-output terminal of the flip-flop circuit 17 is made "0" and its $\overline{Q}$-output terminal is made "1". As a result, the reference pulse obtained at the output side of the NAND circuit 24 is the second reference pulse. Thus, the switching signal from the pulse width modulator 12 is applied through the AND circuit 18 to the base of the transistor 6 to switch the latter. In this case, since the pulse width of the switching signal from the pulse width modulator 12 is modulated in accordance with the level of the DC output voltage obtained at the output terminal 9, the DC output voltage at the output terminal 9 can be made constant. While, when the load connected to the output terminal 9 becomes high, the DC output voltage becomes lowered in correspondence thereto. Thus, the pulse width of the output or switching pulse from the pulse width modulator 12 becomes wide. When the pulse width of the switching signal becomes wider than that b of the second reference pulse as shown in FIG. 3F, the output signal from the exclusive OR circuit 26 becomes "1" at the falling of the second reference pulse (in this case, the Q-output terminal is "0" so that the switching signal is delivered, as it is, to the output side of the exclusive OR circuit 26). Thus, the output side of the comparator 25 becomes "1" and hence the flip-flop circuit 17 is inverted in synchronism with the clock pulse. As a result, the Q-output terminal becomes "1" and the $\overline{Q}$-output terminal becomes "0". Thus, the switching signal is fed through the ANd circuit 19 to the base of the transistor 7.

According to the present invention, when the load at the output terminal is low, the transistor 6 is switched to use all of the primary winding 4a of the transformer 4 or all the inductances ($L_1+L_2$), while when the load at the output terminal 9 is high, only a part of the primary winding 4a between one end and mid tap thereof or inductance $L_1$ is used, so that the effects similar to the prior art shown in FIG. 1 can be performed.

In the invention, since the current at the secondary side of the transformer is not detected, there is no need to use any coupler which will insulate the primary side of the transformer from its secondary side and also any elements for detecting the current are not required. Therefore, the switching regulator of the invention becomes simple in construction.

The above description is given on the single preferred embodiment of the present invention, but it will be apparent that many modifications and variations could be effected by one skilled in the art without departing from the spirits or scope of the novel concepts of the invention. Therefore, the spirits or scope of the invention should be determined by the appended claims only.

I claim as my invention

1. In a switching regulator including a DC voltage source having first and second DC output terminals; a switching transformer having a magnetic core, first and second primary windings connected in series, a secondary winding, a first switching transistor connected in series between said first and second DC output terminals through said first primary winding; a second switching transistor connected in series between said first and second DC output terminals through said first and second primary windings; rectifying means connected across said secondary winding, a load connected to said rectifying means; a clock pulse oscillator; a pulse width modulator supplied with both the outputs from said clock pulse oscillator and as well as the output from said rectifying means so as to produce a PWM control signal the duty of which is proportional to the voltage of said rectifying means; and circuit means for selectively supplying said PWM control signal to said first and second switching transistors in response to the circumstance of said load; said switching regulator further comprising:

(a) reference pulse signal generating means for producing a reference pulse signal having a standard pulse width;

(b) comparing means for comparing the pulse width of said PWM control signal with that of said reference pulse signal and producing a switching signal indicative of the circumstance of said load in response to the comparison result therebetween; and
(c) said circuit means including a gate circuit supplied with the PWM control signal from said pulse width modulator and the switching signal from said comparing means so as to supply the PWM control signal to one of said first and second switching transistors in response to said switching signal.

2. A switching regulator according to claim 1, further including memory means for memorizing said switching signal from said comparing means so as to continuously supply said switching signal to one of said first and second switching transistors during the same circumstance of said load.

3. A switching regulator according to claim 2, in which said memory means comprises a D-type flip-flop.

4. A switching regulator according to claim 3, in which said D-type flip-flop has a T-terminal connected to the output of said clock pulse oscillator, a D-terminal connected to the output of said comparing means and a pair of Q and $\bar{Q}$ output terminals connected to said gate circuit means, respectively.

5. A switching regulator according to claim 4, in which said gate circuit means comprises a pair of AND gate circuits each having a pair of input terminals and an output terminal, one of said input terminals of the pair of AND gate circuits being connected to the Q and $\bar{Q}$ output terminals of said D-type flip-flop, respectively, the other of said input terminals of said pair of AND gate circuits being connected to the output of said pulse width modulator, and said output terminals of said pair of AND gate circuits being connected to said first and second switching transistors, respectively.

6. In a switching regulator including a DC voltage source having a pair of first and second DC output terminals; a switching transformer having a magnetic core, first and second primary windings connected in series, a secondary winding; a first switching transistor connected in series between said first and second DC output terminals through said first primary winding; a second switching transistor connected in series between said first and second DC output terminals through said first and second primary windings; rectifying means connected across said secondary winding; a load connected to said rectifying means; a clock pulse oscillator; a pulse width modulator supplied with outputs from both said clock pulse oscillator and said rectifying means so as to produce PWM control signal the duty of which is proportional to the voltage of said rectifying means; and circuit means for selectively supplying said PWM control signal to said first and second switching transistors in response to the circumstance of said load; said switching regulator further comprising:

(a) first reference pulse signal generating means for producing a first reference pulse signal having a first standard pulse width;
(b) second reference pulse signal generating means for producing a second reference pulse signal having a second standard pulse width which is larger than that of said first standard pulse width;
(c) reference pulse selective means for selecting one of said first and second reference pulse signals and producing the same at the output terminal thereof;
(d) comparing means for comparing the pulse width of said PWM control signal with that of one of said first and second reference pulse signals and producing a switching signal indicative of the circumstance of said load in response to the comparison result therebetween; and
(e) said circuit means including a gate circuit supplied with the PWM control signal from said pulse width modulator and said switching signal from said comparing means so as to supply the PWM control signal to one of said first and second switching transistors in response to the switching signal.

7. A switching regulator according to claim 6, further including memory means for memorizing said switching signal from said comparing means so as to continuously supplying the switching signal to one of said first and second switching transistors during the same circumstance of said load.

8. A switching regulator according to claim 7, in which said memory means comprises a D-type flip-flop.

9. A switching regulator according to claim 8, in which said D-type flip-flop has a T-terminal connected to the output of said clock pulse oscillator, a D-terminal connected to the output of said comparing means and a pair of Q and $\bar{Q}$ terminals connected to said gate circuit means, respectively.

10. A switching regulator according to claim 9, in which said gate circuit means comprises a pair of AND gate circuits each having a pair of input terminals and an output terminal, one of said input terminals of said pair of AND gate circuits being connected to the Q and $\bar{Q}$ terminals of said D-type flip-flop, respectively, the other of input terminals of the pair of said AND gate circuits being connected to the output of said pulse width modulator, and output terminals of the pair of AND gate circuits being connected to said first and second switching transistors, respectively.

11. A switching regulator according to claim 10, which further includes an exclusive OR gate circuit having a pair of input terminals and an output terminal; one of the said of input terminals being connected to the output of said pulse width modulator, the other of said input terminals being connected to the Q-terminal of said D-type flip-flop and the output terminal being connected to said comparing means.

* * * * *